United States Patent
Baker et al.

(10) Patent No.: US 7,389,600 B2
(45) Date of Patent: Jun. 24, 2008

(54) MOTOR-DRIVEN DECORATIVE SPINNER FOR VEHICLES

(76) Inventors: Scott B. Baker, 5530 Kester Ave., Sherman Oaks, CA (US) 91411; Arthur D. Hale, Jr., 6312 Bayshore Walk, Long Beach, CA (US) 90803

( * ) Notice: Subject to any disclaimer, the term of this patent is extended or adjusted under 35 U.S.C. 154(b) by 42 days.

(21) Appl. No.: 11/261,550

(22) Filed: Oct. 28, 2005

(65) Prior Publication Data

US 2006/0107887 A1    May 25, 2006

Related U.S. Application Data

(60) Provisional application No. 60/623,424, filed on Oct. 29, 2004.

(51) Int. Cl.
G09F 11/02 (2006.01)
(52) U.S. Cl. .................. 40/473; 40/591; 40/430
(58) Field of Classification Search ............ 40/414, 40/423, 430, 466, 473, 474, 587, 591; 301/37.25; 180/68.6; 116/28 R; 280/762; 296/1.07
See application file for complete search history.

(56) References Cited

U.S. PATENT DOCUMENTS

| | | | |
|---|---|---|---|
| 1,382,232 A * | 6/1921 | Pyper .......................... 40/438 |
| 1,768,479 A | 6/1930 | Holzhauer |
| 1,841,675 A | 1/1932 | Rood |
| 2,012,468 A * | 8/1935 | Klema .......................... 40/421 |
| 2,252,347 A * | 8/1941 | Otto .............................. 40/432 |
| D153,667 S | 5/1949 | Bustin |
| 2,566,124 A * | 8/1951 | Eaves ........................... 40/435 |
| 2,795,065 A * | 6/1957 | Jauquet et al. ................ 40/435 |
| 2,939,330 A * | 6/1960 | Margetts ....................... 74/411 |
| 3,050,888 A * | 8/1962 | Myers et al. .................. 40/433 |
| 3,323,126 A * | 5/1967 | Malone et al. ............... 342/452 |
| 3,722,958 A | 3/1973 | Marshall |
| 3,818,629 A | 6/1974 | Davidson |
| 5,555,658 A * | 9/1996 | Yu ................................ 40/554 |
| 5,845,972 A | 12/1998 | Baker |
| 5,959,554 A * | 9/1999 | Armstrong et al. .......... 340/908 |
| 6,045,195 A * | 4/2000 | Okamoto ................ 301/37.376 |
| 6,554,370 B2 | 4/2003 | Fowlkes |
| D492,626 S | 7/2004 | Elwell et al. |

* cited by examiner

*Primary Examiner*—William L. Miller
(74) *Attorney, Agent, or Firm*—Colin P. Abrahams

(57) ABSTRACT

A motor-driven decorative spinner rotatably supported by a housing configured for mounting on a vehicle.

5 Claims, 5 Drawing Sheets

MOTOR-DRIVEN DECORATIVE SPINNER FOR VEHICLES

CROSS REFERENCE TO RELATED APPLICATION

This application claims the benefit of U.S. Provisional Application 60/623,424 filed Oct. 29, 2004.

BACKGROUND OF THE INVENTION

There is an increasing demand for accessories useful in customizing automobiles and other motor vehicles. For example, there is now available a wide variety of high-style vehicle wheels which replace standard wheels with more decorative designs. Some of these custom designs include wheel-driven and freely rotatable spinners, and examples are disclosed in U.S. Pat. Nos. 3,722,958 and 6,554,370.

This invention relates to a relatively small electric-motor-driven decorative spinner which is well suited for central mounting in a vehicle radiator grill, but can be supported on other parts of a vehicle body. The motor can be operable by the vehicle battery whenever the ignition is actuated, or can be controlled by a separate switch accessible to the driver. A variety of different decorative designs can be used for the spinner, and are easily mounted on the drive-motor assembly.

SUMMARY OF THE INVENTION

This invention relates to a motor-driven decorative spinner assembly for mounting on a vehicle. A housing is adapted for vehicle mounting, and supports the spinner on a bearing-mounted shaft which is rotated by an electric motor. In one form, the assembly is configured to be received in a recess in a radiator grill of a motor vehicle.

DETAILED DESCRIPTION OF THE PREFERRED EMBODIMENTS

Figure 1:
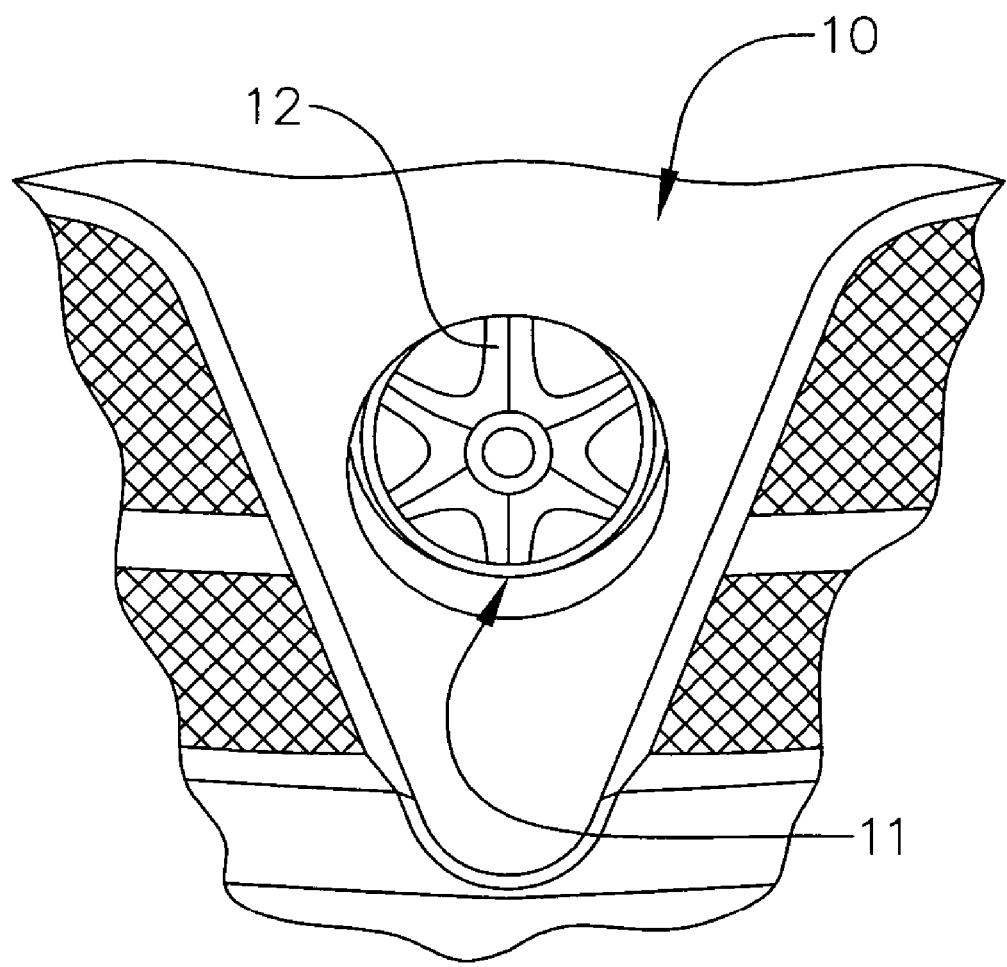
FIG. 1 is a front view of a portion of a vehicle radiator grill with a spinner assembly of this invention supported thereon.
Figure 2:
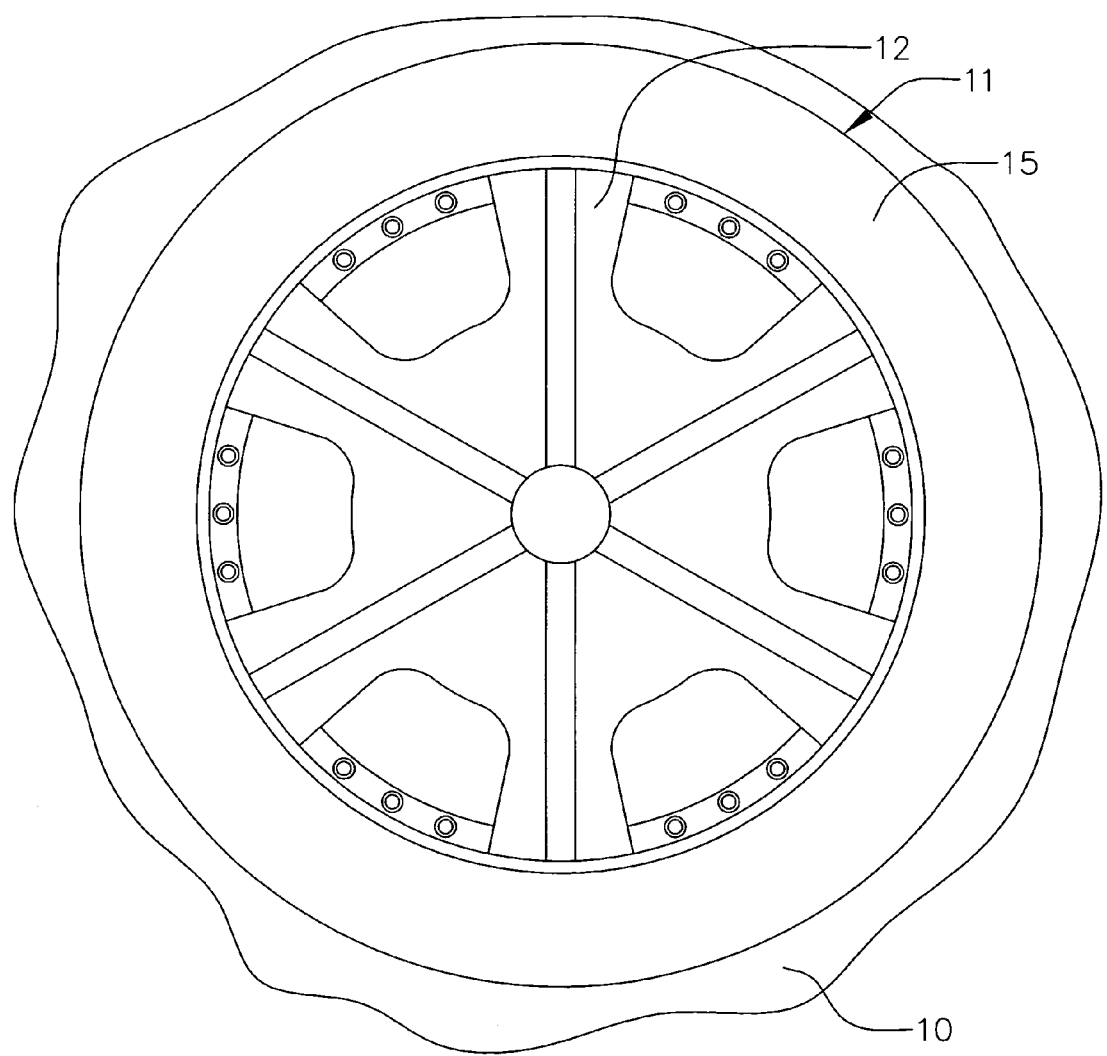
FIG. 2 is a front view of the spinner assembly on line 2-2 of FIG. 3.

FIG. 1 is a front view of a portion of a vehicle radiator grill 10 in which is mounted a spinner assembly 11 with a decorative spinner 12.

Figure 3:
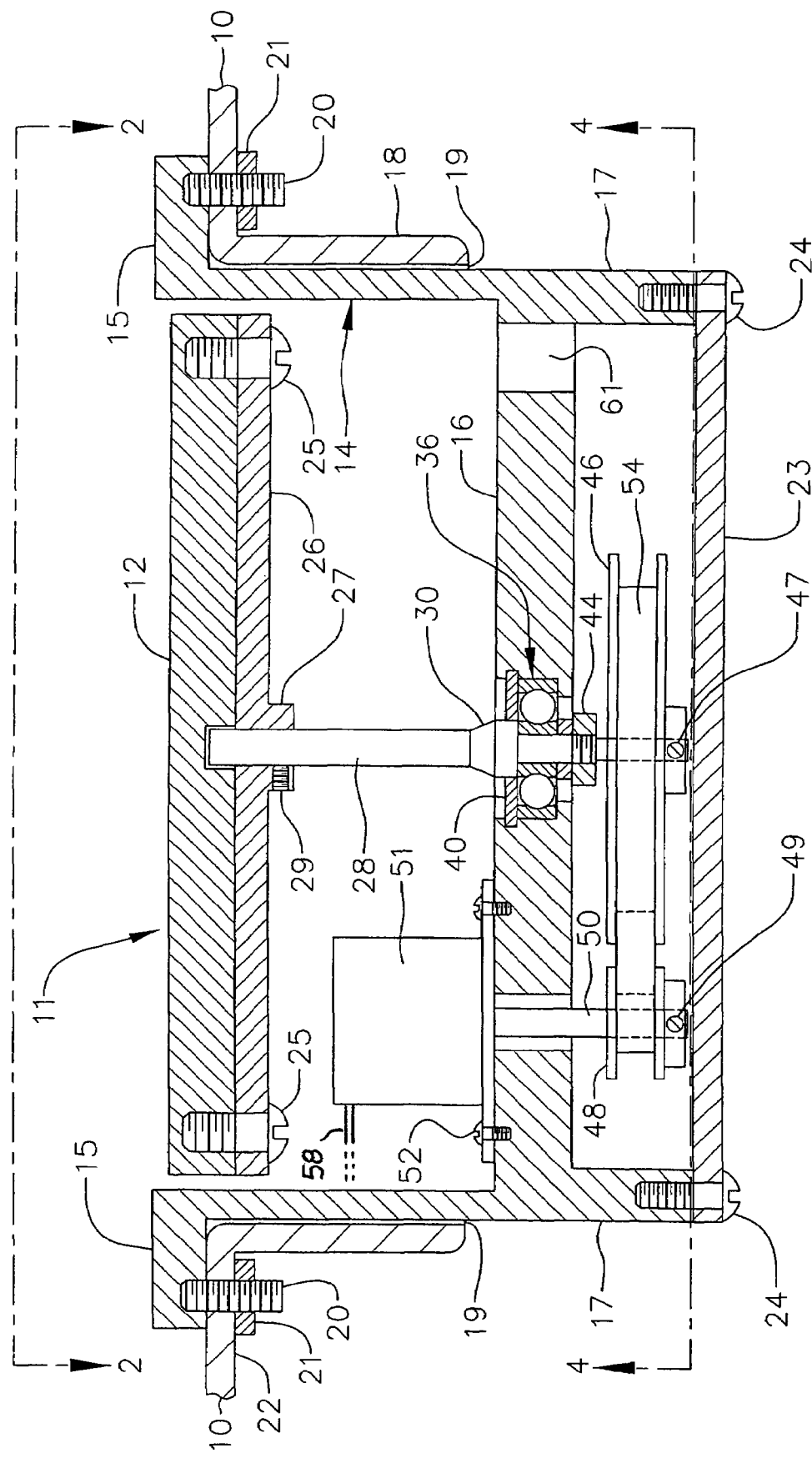
FIG. 3 is a slightly enlarged top sectional view of the assembly.
Figure 4:
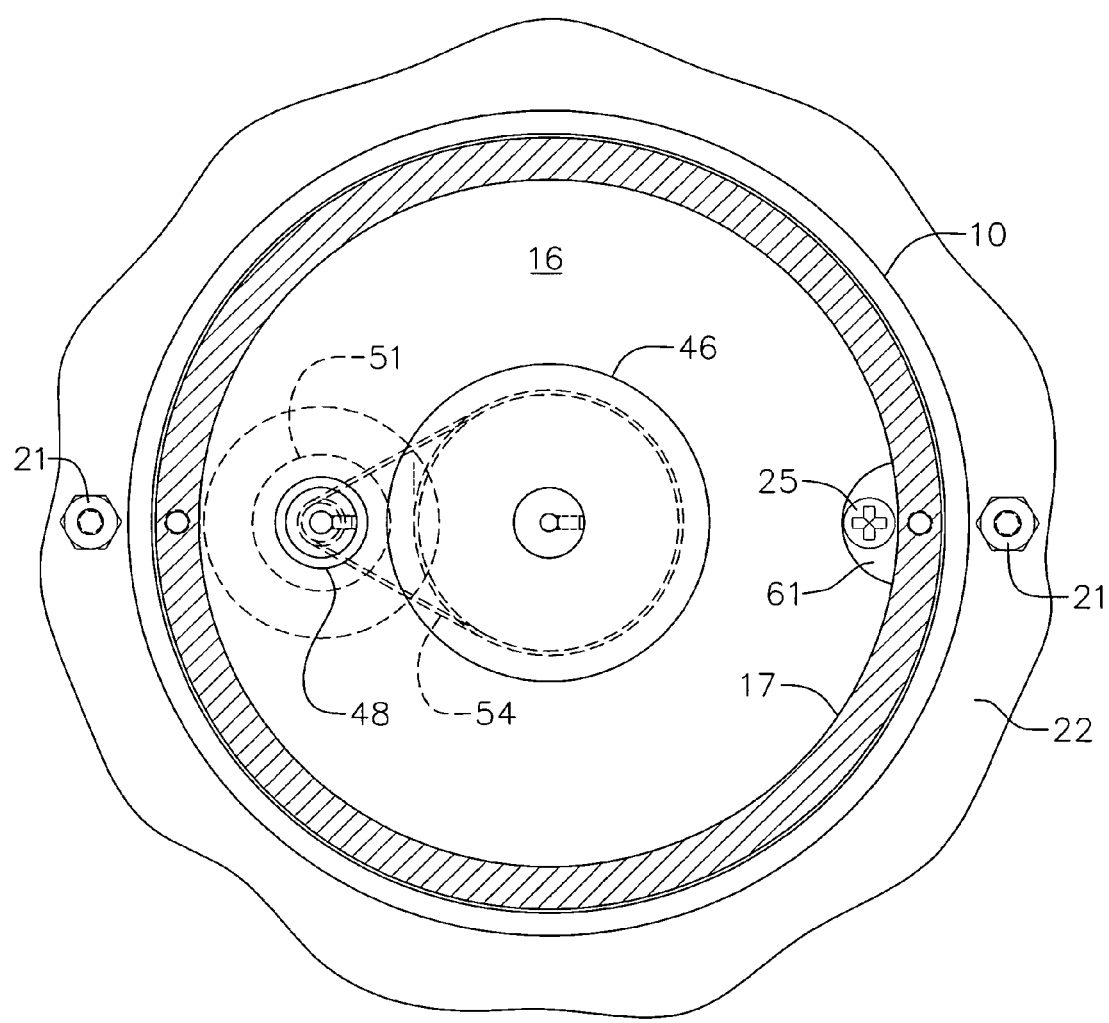
FIG. 4 is a rear sectional view of the assembly on line 4-4 of FIG. 3.
Figure 5:
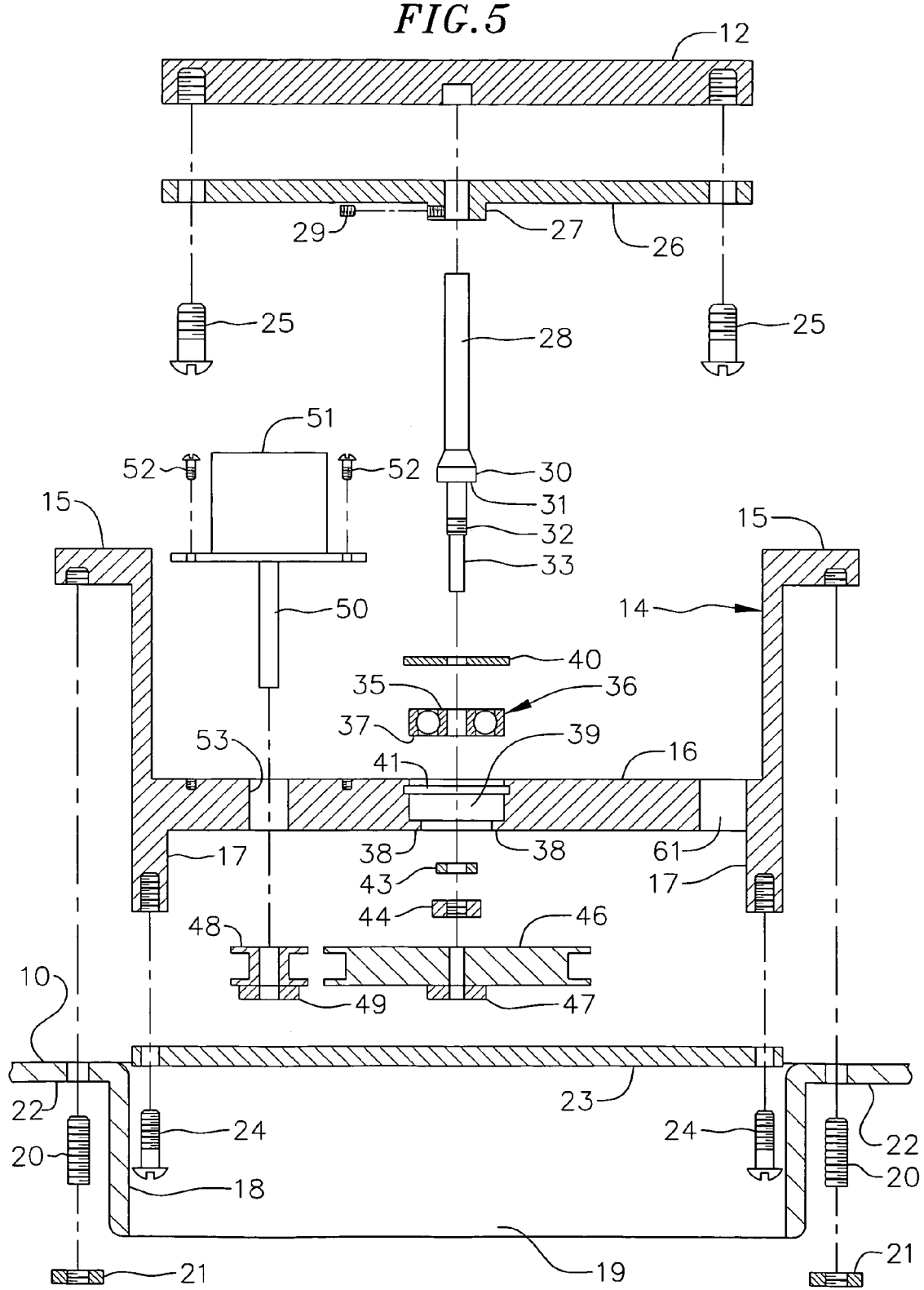
FIG. 5 is an exploded top sectional view of the assembly.

Assembly 11 is shown in greater detail in FIGS. 3-5, and includes a generally cylindrical housing 14 (of, for example, cast aluminum) having a forward end with an outwardly extending flange 15, and a rearwardly spaced plate 16 extending thereacross. A back portion 17 of housing 14 extends rearwardly from the rear plate. As shown in FIG. 3, radiator grill 10 has a rearwordly extending portion 18 with a circular opening 19 which receives the spinner assembly, and these components are secured together by threaded fasteners 20 engaged with nuts 21 resting against a rear surface 22 of the grill. The back of housing 14 is closed by a cover plate 23 secured to back portion 17 by screws 24.

Again referring to FIGS. 3-5, decorative spinner 12 is secured by screws 25 to a circular backing plate 26 having a central hub 27 which receives a cylindrical and rearwardly extending driveshaft 28 secured to the hub by a setscrew 29. The rearward part of the driveshaft has a radially enlarged hub 30 with a flat rear surface 31, a threaded section 32, and a rear end 33 of slightly reduced diameter.

Driveshaft hub 30 is fitted against an inner race 35 of a ball-bearing assembly 36 with an outer race 37 seated against an inwardly extending flange 38 in a central circular opening 39 in plate 16 of housing 14. The bearing assembly is secured in opening 39 by a snap ring 40 seated in a circular groove 41 adjacent a forward end of opening 39. The driveshaft hub is rigidly secured to the bearing inner race by a washer 43 and clamping nut 44 secured to threaded section 32.

Rear end 33 of driveshaft 28 extends rearwardly from plate 16, and a first pulley 46 is fitted thereover and secured by a setscrew 47 in a hub of the pulley. A second pulley 48 in alignment with the first pulley is similarly secured by a setscrew 49 to a shaft 50 of an electric motor 51. The motor is secured to the front surface of plate 16 by screws 52, and shaft 50 extends rearwardly through a circular opening 53 through plate 16. The pulleys are connected by a drive belt 54 (an elastomeric O-ring is suitable) as shown in FIGS. 3 and 4, and are enclosed in the rear part of housing 14 by back cover plate 23.

"Motor 51 is connected to a power source in the vehicle by means of electric cable represented by reference numeral 58 and is selected to match the vehicle-battery operating voltage, and may be actuated when the vehicle ignition switch is closed, or may be controlled by a separate switch. Selecting a rotation rate suitable for the style of decorative spinner in use can be achieved by varying the voltage applied to the motor, and alternatively by varying the respective diameters of the first and second pulleys which are readily accessible. Rotation rates in the range of 25 to 125 rpm are typical."

A variety of different designs of decorative spinner 12 are suitable, and can be changed if desired by removing back cover plate 23 to enable access to screws 25 through an opening 61 in plate 16 as shown in FIGS. 3-4. In an alternative embodiment, light sources such as light-emitting diodes can be mounted on plate 16 to shine through openings provided in backing plate 26 and the decorative spinner.

The spinner assembly is not restricted to mounting on a radiator grill, and can be easily mounted in other positions such as on a bumper, fender, rear body panel, etc. Similarly, housing 14 need not be cylindrical, and can be varied in shape to suit specific applications.

The invention claimed is:

1. A motor-driven decorative spinner assembly for mounting on a vehicle, comprising:
    a decorative spinner having a rearwardly extending shaft secured centrally thereto;
    a housing mounted on an exterior receiving member of the vehicle and having means for securing the housing to the exterior receiving member of the vehicle, the exterior receiving member defining a recess, the housing configured to fit within the recess, the housing having a forwardly open end which receives the spinner, the housing supporting a bearing assembly which in turn receives and supports the spinner shaft;
    an electric motor supported by the housing, and having a drive shaft; and
    coupling means connecting the motor drive shaft to the spinner shaft, whereby actuation of the motor causes the spinner to rotate.

2. The assembly defined in claim 1, and further comprising connecting means for coupling the electric motor to a power source in the vehicle.

3. The assembly defined in claim 1, in which the coupling means comprises a pair of spaced-apart pulleys, and a belt engaged with the pulleys.

4. The assembly defined in any of claims 1, 2, or 3, wherein the exterior receiving number is a radiator grill.

5. A motor-driven decorative spinner assembly for mounting on a vehicle, comprising:

- a decorative spinner having a rearwardly extending shaft secured centrally thereto;
- a housing adapted for mounting on the vehicle and having a forwardly open end which receives the spinner, the housing supporting a bearing assembly which in turn receives and supports the spinner shaft;
- an electric motor supported by the housing, and having a drive shaft;
- coupling means connecting the motor drive shaft to the spinner shaft, whereby actuation of the motor causes the spinner to rotate; and
- wherein the vehicle has a radiator grill defining a recess, the housing being configured to fit within the recess, and means for securing the housing to the vehicle within the recess.

* * * * *